United States Patent
Huang et al.

(10) Patent No.: US 11,497,102 B2
(45) Date of Patent: Nov. 8, 2022

(54) METHOD FOR DETECTING NUMBER OF LAMP BEADS, CONTROLLER, LIGHTING MODULE AND STORAGE MEDIUM

(71) Applicant: Glowworm (Shenzhen) Lighting Technology Co., Ltd., Shenzhen (CN)

(72) Inventors: Mingxu Huang, Shenzhen (CN); Tianfei Zhou, Shenzhen (CN); Jiancan Chen, Shenzhen (CN); Fuzhi Zheng, Shenzhen (CN)

(73) Assignee: GLOWWORM (SHENZHEN) LIGHTING TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/643,561

(22) Filed: Dec. 9, 2021

(65) Prior Publication Data
US 2022/0191983 A1   Jun. 16, 2022

(30) Foreign Application Priority Data

Dec. 11, 2020 (CN) .......................... 202011445313.X
Aug. 10, 2021 (CN) .......................... 202110914725.1

(51) Int. Cl.
| | | |
|---|---|---|
| H05B 45/14 | (2020.01) | |
| H05B 45/50 | (2022.01) | |
| F21S 4/24 | (2016.01) | |
| F21V 33/00 | (2006.01) | |
| H05B 47/165 | (2020.01) | |
| H05B 45/20 | (2020.01) | |
| H05B 47/17 | (2020.01) | |
| H05B 47/105 | (2020.01) | |
| H04N 19/172 | (2014.01) | |
| H04N 19/186 | (2014.01) | |
| H04N 19/44 | (2014.01) | |

(Continued)

(52) U.S. Cl.
CPC ......... *H05B 47/165* (2020.01); *H04N 19/172* (2014.11); *H04N 19/186* (2014.11); *H04N 19/44* (2014.11); *H05B 45/14* (2020.01); *H05B 45/20* (2020.01); *H05B 45/50* (2020.01); *H05B 47/105* (2020.01); *H05B 47/125* (2020.01); *H05B 47/17* (2020.01); *H05B 47/18* (2020.01); *F21S 4/24* (2016.01); *F21V 33/0052* (2013.01); *F21Y 2115/10* (2016.08)

(58) Field of Classification Search
CPC .................................................. F21Y 2115/10
See application file for complete search history.

(56) References Cited

U.S. PATENT DOCUMENTS

2021/0112645 A1* 4/2021 Knipp ................. H05B 47/105

FOREIGN PATENT DOCUMENTS

| WO | WO-2017148811 A1 * | 9/2017 | ............ H05B 45/46 |
|---|---|---|---|
| WO | WO-2021239570 A1 * | 12/2021 | |

* cited by examiner

*Primary Examiner* — Anh Q Tran
(74) *Attorney, Agent, or Firm* — M&B IP Analysts, LLC

(57) ABSTRACT

Disclosed are a method for detecting a number of lamp beads, a controller, a lighting module and a storage medium. The method for detecting a number of lamp beads may include: acquiring a reference electrical parameter value of the lamp bank; controlling the plurality of lamp beads to turn on or turn off according to a preset rule, and acquiring a current electrical parameter value of the lamp bank; and determining the number of current lamp beads according to the reference electrical parameter value and the current electrical parameter value.

13 Claims, 8 Drawing Sheets

(51) Int. Cl.
*H05B 47/125* (2020.01)
*H05B 47/18* (2020.01)
*F21Y 115/10* (2016.01)

METHOD FOR DETECTING NUMBER OF LAMP BEADS, CONTROLLER, LIGHTING MODULE AND STORAGE MEDIUM

CROSS-REFERENCE TO RELATED APPLICATIONS

This application claims priority to Chinese patent application No. 202110914725.1 filed Aug. 10, 2021, and Chinese patent application No. 202011445313.X filed Dec. 11, 2020, the entire contents of which are incorporated herein by reference.

TECHNICAL FIELD

The present application relate to the field of light control technologies, and more particularly, to a method for detecting a number of lamp beads, a controller, a lighting module and a non-transitory computer-readable storage medium.

BACKGROUND

With the increasing of people's living standard, lighting devices have been widely used. For example, people can set their favorite scenario and circumstance lighting effects according to their own lighting needs (such as color, temperature, brightness and direction, or the like), and select and control the changes of brightness, gray scale and color of light in different spaces and times according to their own requirements and scenario conditions.

Currently, the control mode for a display effect of a lamp bank with multiple lamp beads is single. If the lamp bank can be flexibly controlled, it is necessary to acquire the number of lamp beads of the lamp bank (that is, a length of the lamp bank) in advance. However, the length of the lamp bank cannot be detected through the existing technology, which brings inconvenience to the production, sales and use of a lamp module.

SUMMARY

The following is an overview of the subject detailed herein. This summary is not intended to limit the protection scope of the claims.

Some embodiments of the present application provide a method and apparatus for detecting a number of lamp beads, a controller, a module and a non-transitory computer-readable storage medium, which are capable of effectively improving flexibility and adaptivity of a control mode of a lighting device.

In a first aspect, an embodiment of the present application provides a method for detecting a number of lamp beads applied to a lighting controller, wherein the lighting controller is in communication connection with a lamp bank, the lamp bank includes a plurality of lamp beads connected in sequence, and the method includes:

acquiring a reference electrical parameter value of the lamp bank;

controlling the plurality of lamp beads to be turned on or turned off according to a preset rule, and acquiring a current electrical parameter value of the lamp bank; and obtaining the number of current lamp beads by determining according to the reference electrical parameter value and the current electrical parameter value.

In a second aspect, the present application further provides a lighting controller, including: a memory, a processor and a computer program stored in the memory and executable by the processor, wherein the data processing program, when executed by the processor, causes the processor to perform the method for detecting the number of lamp beads according to the first aspect.

In a third aspect, the present application further provides a lighting module, including:

the lighting controller according to the second aspect; and a lamp bank, wherein the lamp bank is in communication connection with the lighting controller; and the lamp bank includes a plurality of lamp beads connected in sequence.

In a fourth aspect, the present application further provides a non-transitory computer-readable storage medium storing a computer-executable instruction which, when executed by a processor, causes the processor to perform the method for detecting the number of lamp beads according to the first aspect.

Compared with the existing technology, the method for detecting the number of lamp beads provided by the embodiment of the present application according to the first aspect compares the electrical parameter detected when the lamp bank is turned on or turned off according to the preset rule with the reference electrical parameter, and intelligently determines the number of lamp beads currently possessed by the lamp bank according to the comparison result, thereby realizing the automatic counting of the number of lamp beads, thus realizing length detection of the lamp bank, further facilitating the standardized design of the lamp bank and facilitating the production, sales and use of the lighting module.

It may be understood that, the beneficial effects of the second aspect to the fourth aspect in comparison to the existing technology are the same as the beneficial effects of the first aspect in comparison to the existing technology, which may be referred to the related description in the first aspect and will not be repeated here.

DETAILED DESCRIPTION

Figure 1:
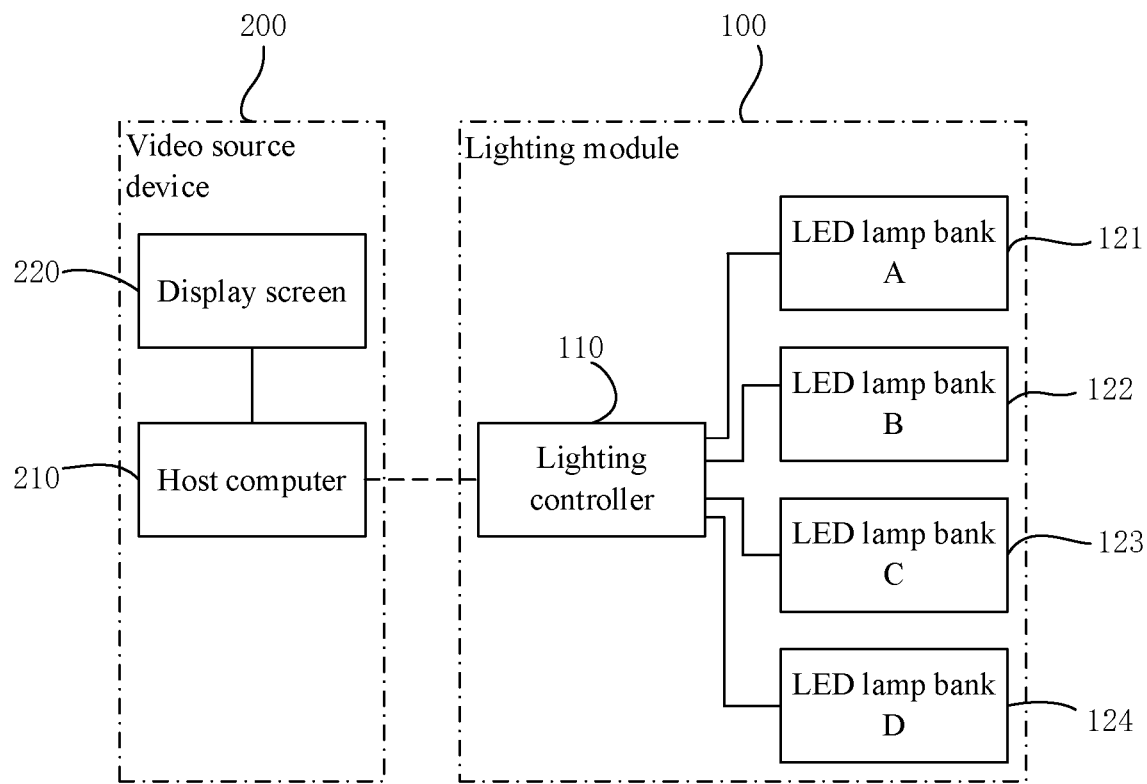
FIG. 1 is a schematic diagram of a system architecture for executing a method for detecting a number of lamp beads provided by an embodiment of the present application.

In the following description, details, such as module structure and technology, are put forward for illustration rather than limitation, so as to thoroughly understand the embodiments of the present application. However, it should be clear to those skilled in the art that the embodiments of the present application can be practiced in other embodiments without these specific details. In other cases, detailed descriptions of well-known modules, devices, circuits and methods are omitted so as not to hinder the description of the embodiments of the present application with unnecessary details.

It should be noted that, although a logical sequence is shown in the flowchart, in some cases, the steps shown or described may be executed in a sequence different from the flowchart. The terms "first", "second" and the like in the specification and claims as well as the above drawings are used to distinguish similar objects, and are not necessarily used to describe a specific sequence or a chronological order.

It should also be understood that the reference to "one embodiment" or "some embodiments" described in the specification of the embodiments of the present application means that the specific features, structures or characteristics described in connection with this embodiment are included in one or more of the embodiments of the present application. Therefore, the phrases "in one embodiment", "in some embodiments", "in some other embodiments" and "in some another embodiments" appearing in different places in this specification do not necessarily all refer to the same embodiment, but mean "one or more but not all embodiments" unless otherwise specially emphasized. The terms "comprising", "containing", "having" and their variants all mean "including but not limited to" unless otherwise specifically emphasized.

With the increasing of people's living standard, lighting devices have been widely used due to simple control thereof. People can set their favorite scenario and circumstance lighting effects according to their own lighting needs (such as color, temperature, brightness and direction, or the like), and select and control the changes of brightness, gray scale and color of light in different spaces and times according to their own requirements and scenario conditions.

Currently, the control mode for a display effect of a lamp bank with multiple lamp beads is single. If the lamp bank can be flexibly controlled, it is necessary to acquire the number of lamp beads of the lamp bank (that is, a length of the lamp bank) in advance. However, the length of the lamp bank cannot be detected through the existing technology, which brings inconvenience to the production, sales and use of a lamp module.

For example, due to the different lengths of lamp bank required by different application scenarios, in order to match the different size requirements of the application scenarios, a clipable LED lamp bank (such as an LED lamp bank formed by WS2812 series smart lamp bead chips or WS2813 series smart lamp bead chips connected in series) may be adopted. Because the length of the LED lamp bank after cutting is unknown to a controller, the controller cannot effectively control the LED lamp bank. In the related art, an actual length of the LED lamp bank (the number of lamp beads after cutting) is usually obtained by manual input, but this method is time-consuming and laborious, which brings inconvenience to users and easily leads to poor user experience.

Based on this, the embodiments of the present application provide a method for detecting a number of lamp beads, a controller, a lighting module and a non-transitory computer-readable storage medium, which, compared with the existing technology, compares an electrical parameter detected when the lamp bank is turned on or turned off according to a preset rule with a reference electrical parameter, and intelligently determines the number of lamp beads currently possessed by the lamp bank according to the comparison result, thereby realizing the automatic counting of the number of lamp beads, thus realizing length detection of the lamp bank, further facilitating the standardized design of the lamp bank and facilitating the production, sales and use of the lighting module.

The embodiments of the present application are further described below with reference to the accompanying drawings.

As shown in FIG. 1, FIG. 1 is a schematic diagram of a system architecture of a method for detecting a number of lamp beads provided by an embodiment of the present application. In the example of FIG. 1, the system architecture includes a lighting module 100, and the lighting module 100 includes a lighting controller 110 and at least one lamp bank. The lighting controller 110 is in communication with the lamp bank by wired or wireless means.

As for the lighting controller 110, the lighting controller 110 is configured for executing the method for detecting the number of lamp beads. In some embodiments, the lighting controller 110 includes a control signal generation module and an output module. A lamp bead number acquisition module is configured for acquiring the number of lamp beads of the lamp bank; a control signal generation module is configured for generating a corresponding light control signal according to the number of lamp beads; and the output module is configured for outputting the light control signal to the lamp bank to control an operating state of the lamp bank.

Figure 2:
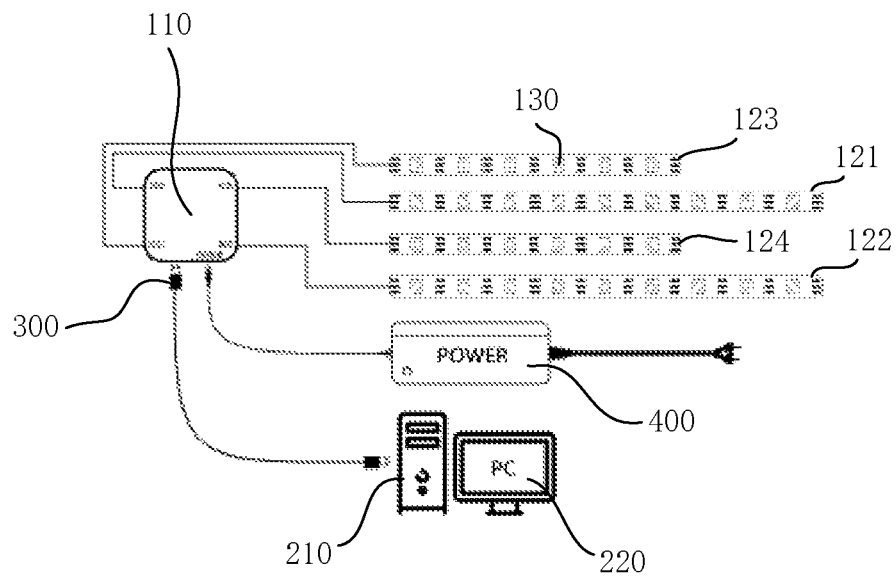
FIG. 2 is a schematic diagram of a system architecture of a light control system provided by an embodiment of the present application.

With reference to FIG. 2, the lamp bank is in communication connection with the lighting controller 110. The lamp bank may be an LED lamp bank 121/122/123/124 or other multi-color lamp bank, such as an OLED lamp bank. The lamp bank may include a plurality of lamp beads 130. For example, when the lamp bank is the LED lamp bank 121/122/123/124, the LED lamp bank includes a plurality of smart integrated LED light sources (lamp beads 0130) sequentially connected in series. The following embodiments will only be described by taking the LED lamp bank 121/122/123/124 as an example.

Figure 3:
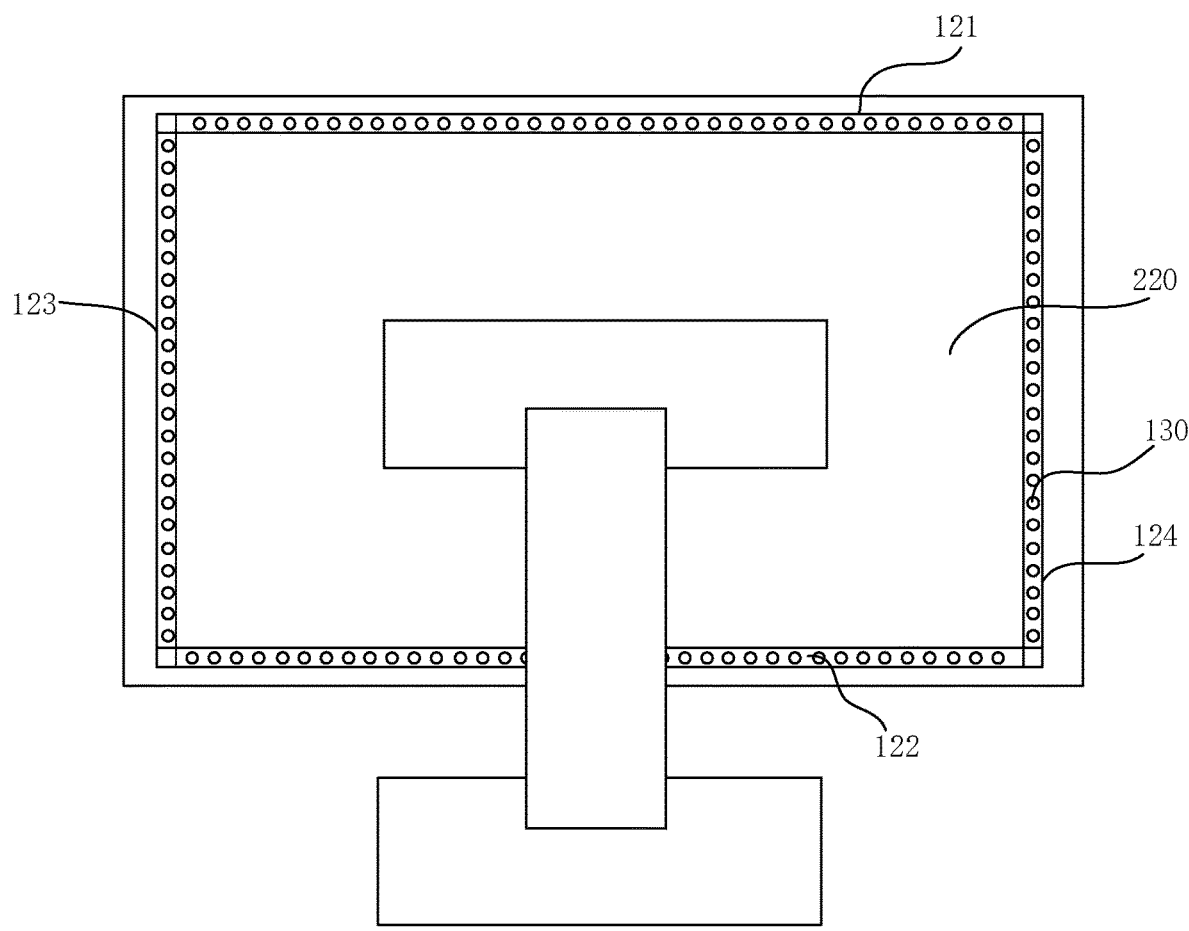
FIG. 3 is a structural schematic diagram of installing a lamp bank on a back of a display screen provided by an embodiment of the present application.

In some scenarios, as shown in FIG. 1 and FIG. 2, the lighting module 100 may be configured for picture synchronous display. A picture synchronous display system also includes a video source device 200, and the lighting controller 110 is configured for being in communication connection with the video source device 200 to acquire video data information from the video source device; and generating a corresponding light control signal according to color video data information and the number of lamp beads, and outputting the light control signal to the lamp bank to control the operating state of the lamp bank to match the video data information. For example, the video source device 200 may be a personal computer, including a host computer 210 and a display screen 220. The host computer 210 is connected with the lighting controller 110 and the display screen 220 is connected with the host computer 210. A setting position of the lamp bank is matched with a display picture of the display screen 220 of the video source device 200, so that a bright color state (operating state) of the lamp bank can match a display picture content of the display screen 220. For example, the LED lamp bank may be LED lamp strip 121/122/123/124, which is respectively arranged on a back (as shown in FIG. 3) or a side face of the display screen 220 of the video source device 200. For another example, the plurality of LED lamp banks is correspondingly arranged on four sides of the display screen facing a ceiling/floor/wall of a living room/cinema respectively. For another example, the LED lamp bank may be a vertical lamp bank, which is correspondingly arranged on two sides of the display screen respectively.

It should be noted that in the following various embodiments, the electrical parameter value may be a current value, a voltage value, a power value, or the like. Correspondingly, the lighting controller 110 may acquire the electrical parameter value of the lamp bank through a current detection module, a voltage detection module or a power detection module, and the like, which is not limited in the present application. The following various embodiments will only be described by taking the electrical parameter value being the current value as an example.

Figure 4:
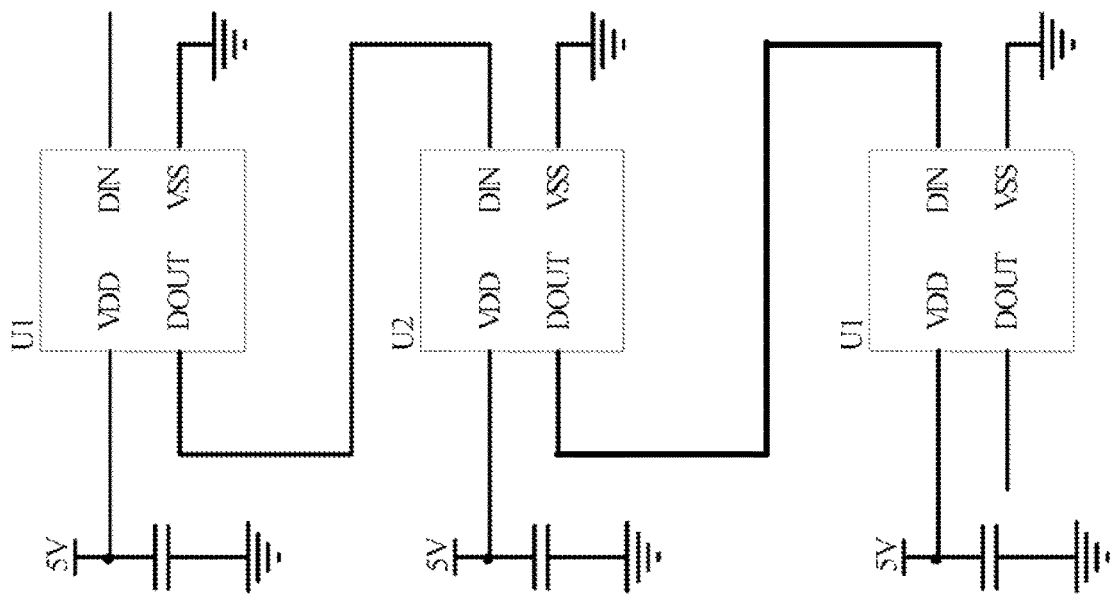
FIG. 4 is a schematic structural diagram of an internal circuit of a lamp bank provided by an embodiment of the present application.

Referring to FIG. 4, in some embodiments, the LED lamp bank includes a plurality of smart integrated LED light sources (lamp beads) connected in sequence, and smart lamp beads of WS2812 series chips are employed in the smart integrated LED light sources (lamp beads). Control signals of the plurality of lamp beads are connected in series in sequence through data input ends DIN and data output ends DOUT of the WS2812 series smart lamp bead chips, and power supply signals of the plurality of lamp beads are connected in parallel (positive electrode sides VDD of the smart lamp beads of WS2812 series chips are all connected with a cathode of the power supply, and negative electrode sides VSS of the smart lamp beads of WS2812 series chips are all connected with a lamp strip ground). As shown in FIG. 4, the lamp bank includes a first smart light bead chip U1, a second smart light bead chip U2 and a third smart light bead chip U3, and a data input end DIN of the first smart light bead chip U1 is configured for receiving a data control signal of the lighting controller 110.

Figure 5:
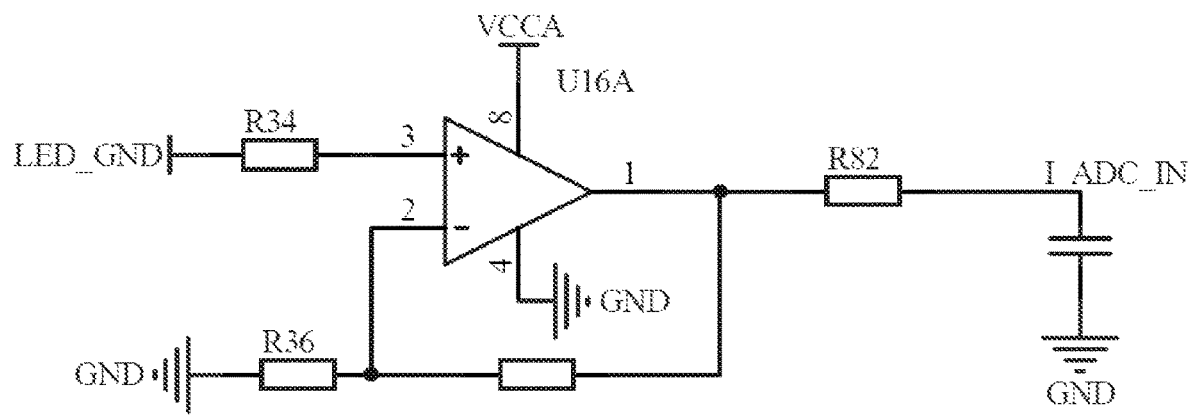
FIG. 5 is a schematic diagram of a circuit structure of a current detection module provided by an embodiment of the present application.

In some embodiments, refer to FIG. 5, which is a circuit diagram of a current detection module provided by an embodiment of the present application. The current detection module includes a lamp strip ground LED_GND and an operational amplifier U16A, a first resistor R34 and a second resistor R36. A first end of the first resistor R4 is connected with a positive phase end of the operational amplifier U16A, a second end of the first resistor R4 is connected with the lamp strip ground LED_GND, a first end of the second resistor R36 is connected with a negative phase end of the operational amplifier U16A, a second end of the second resistor R36 is connected with a system ground GND, and an output end of the operational amplifier U16A is connected with a current detection end I_ADC_IN of the lighting controller 110 through the third resistor R82. In this way, it is possible to detect a power supply current of the lighting module 100 and transmit the detected power supply current to the lighting controller 110.

The system architectures and the application scenarios described in the embodiments of the present application are only for the purpose of more clearly explaining the technical solutions of the present application and do not constitute a limitation to the technical solutions provided by the present application. Those of ordinary skill in the art may know that with the evolution of the system architectures and the emergence of new application scenarios, the technical solutions provided by the embodiments of the present application are also applicable to similar technical problems.

Those skilled in the art can understand that the system architecture shown in FIG. 1 does not constitute a limitation to the embodiments of the present application, and may include more or less components than the illustrated components, or combine some components, or have different component arrangements.

In the system architecture shown in FIG. 1, the lighting controller may call a lamp bead number detection program stored thereon to execute the method for detecting the number of lamp beads.

On the basis of the above-mentioned system architecture, various embodiments of the method for detecting the number of lamp beads according to the embodiments of the present application are proposed.

Figure 6:
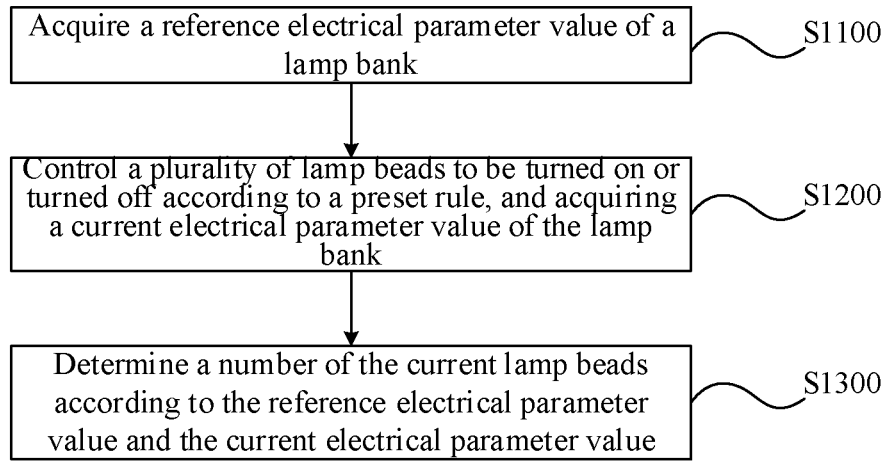
FIG. 6 is a flowchart of a method for detecting a number of lamp beads provided by an embodiment of the present application.

As shown in FIG. 6, an embodiment of the present application provides a method for detecting a number of lamp beads applied to a lighting controller, wherein the lighting controller is in communication connection with a lamp bank, the lamp bank includes a plurality of lamp beads connected in sequence, and the method includes:

S1100: acquiring a reference electrical parameter value of the lamp bank;

S1200: controlling the plurality of lamp beads to be turned on or turned off according to a preset rule, and acquiring a current electrical parameter value of the lamp bank; and S1300: obtaining the number of the current lamp beads by determining according to the reference electrical parameter value and the current electrical parameter value.

In some embodiments, the number of lamp beads (smart integrated LED light sources) corresponding to each lamp bank is different due to the different lengths of lamp banks corresponding to different application scenarios. For example, the number of lamp beads corresponding to a lamp bank on a long edge of a display screen is more, and the number of lamp beads corresponding to a lamp bank on a short edge of the display screen is less. After the lamp bank is installed, in order to easily detect the number of lights, an automatic algorithm for detecting the number of lamp beads is designed.

In some embodiments, the reference electrical parameter value and the current electrical parameter value may be acquired by an electrical parameter detection module. The object to detect the electrical parameters is to detect the electrical parameters of a certain lamp bead in the lamp bank in different operating states, and obtain the number of lamp beads in each lamp bank by calculating according to the electrical parameter detected when the lamp beads in the lamp bank are turned on or turned off. Subsequently, the lighting controller can output a control signal to the LED lamp bank according to the light control information and the number of lamp beads of each LED lamp bank.

In the actual production process, the lamp bank may be manufactured according to a uniform standard length (the number of lamp beads), and then a customer may cut the lamp bank according to the actual demand. After power-on, the lighting module calculates the actual number of lamp beads by the above-mentioned automatic algorithm for the number of lamp beads and controls the light. Standardized design of manufacturing can be realized by manufacturing the lamp bank according to the uniform standard length (the number of lamp beads), thus effectively saving the production and sales costs.

Compared with the existing technology, the method for detecting the number of lamp beads provided by the embodiment of the present application compares the electrical parameter detected when the lamp bank is turned on or turned off according to the preset rule with the reference electrical parameter, and intelligently determines the number of lamp beads currently possessed by the lamp bank according to the comparison result, thereby realizing the automatic counting of the number of lamp beads, thus realizing length detection of the lamp bank, further facilitating the standardized design of the lamp bank and facilitating the production, sales and use of the lighting module.

As an optional embodiment, the preset rule is: changing a combination or a position of turning on or turning off of the lamp beads in the lamp bank in turn; and correspondingly, in S1300, the obtaining the number of current lamp beads by determining according to the reference electrical parameter value and the current electrical parameter value, includes:

S1301: comparing the current electrical parameter value with the reference electrical parameter value to obtain a comparison result, and if the comparison result is not in conformity with a stop condition, adjusting a counting variable;

S1302: changing the combination or the position of turning on or turning off of the lamp beads in the lamp bank, and repeating the above steps S1200 and S1301 until the comparison result is in conformity with the stop condition; and S1303: acquiring the current counting variable, and obtaining the number of lamp beads according to the current counting variable.

As an optional embodiment, the preset rule includes at least one of the followings: a forward one-by-one turning-on rule, a forward one-by-one turning-off rule, a forward fixed-length sliding-window turning-on rule, a forward fixed-length sliding window turning-off rule, a backward one-by-one turning-on rule, a backward one-by-one turning-off rule, a backward fixed-length sliding-window turning-on rule, a backward fixed-length sliding-window turning-off rule, a backward cumulative turning-on rule, and the like.

In some embodiments, in order to realize automatic detection of the number of lamp beads, the operating state of lamp beads may be controlled by setting different rules, and the electrical parameters of the lamp beads in different operating states may be detected by the electrical parameter detection module, so as to determine the number of lamp beads. Combined with different preset rules, the following introduces a plurality of methods that may be used to detect the number of lamp beads.

It should be noted that the reference electrical parameter value may be a preset value or an externally acquired value, and may also be a value detected by the electrical parameter detection module, which is not limited in the present application. When the reference electrical parameter value is the value detected by the electric parameter detection module, the reference electric parameter value may be a fully-turned off electrical parameter value (the electric parameter value detected in the fully-turned off operating state of the lamp bead) or a fully-lit electrical parameter value (the electric parameter value detected in the fully-lit operating state of the lamp bead) or a partially-lit electrical parameter value, and the like.

Figure 7:
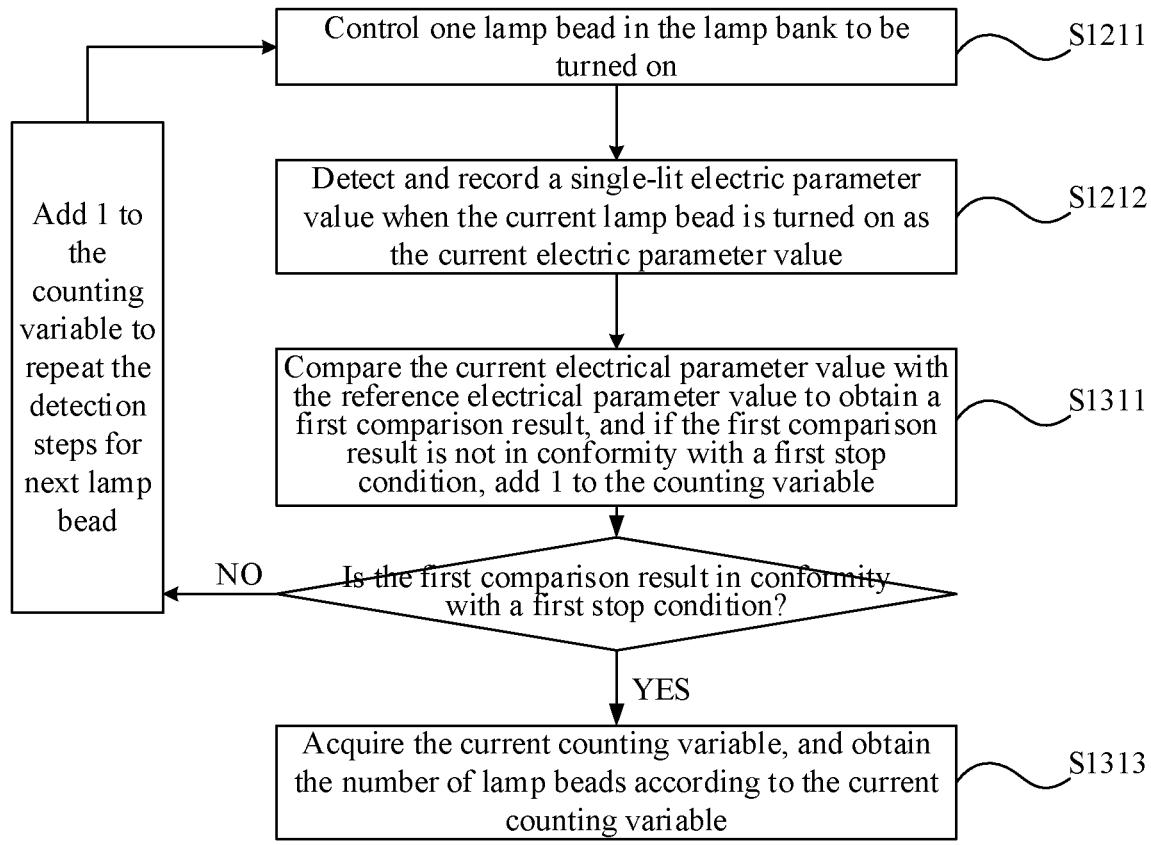
FIG. 7 is a flowchart of a method for detecting a number of lamp beads provided by another embodiment of the present application.

As an optional embodiment, when the preset rule is the forward one-by-one turning-on rule;

correspondingly, referring to FIG. 7, the controlling the plurality of lamp beads to be turned on or turned off according to the preset rule, and acquiring the current electrical parameter value of the lamp bank; and obtaining the number of current lamp beads by determining according to the reference electrical parameter value and the current electrical parameter value, include:

S1211: controlling one lamp bead in the lamp bank to be turned on;

S1212: detecting and recording a single-lit electric parameter value when the current lamp bead is turned on as the current electric parameter value;

S1311: comparing the current electrical parameter value with the reference electrical parameter value to obtain a first comparison result, and if the first comparison result is not in conformity with a first stop condition, adding 1 to the counting variable, and executing S1312; otherwise, executing S1313;

S1312: repeating the above S1211 to S1311 for next lamp bead until the first comparison result is in conformity with the first stop condition; and S1313: acquiring the current counting variable, and obtaining the number of lamp beads according to the current counting variable.

In some embodiments, the reference electrical parameter value of the lamp bank may be acquired by executing S1100 first. For example, acquiring the reference electrical parameter value of the lamp bank includes:

S1110: controlling the lamp beads of the LED lamp bank to be fully turned off, and detecting and recording a current fully-turned off current value M1 as the reference electrical parameter value.

In some embodiments, S1211 may start from a first lamp bead (generally a lamp bead connected with the lighting controller) of the lamp bank and control the first lamp bead in the lamp bank to be turned on; and then determine whether the lamp bead exists by executing S1212 to S1311, and if yes, detect next lamp bead till the last lamp bead.

In some embodiments, in S1311, the first stop condition may be that the current electrical parameter value is less than or equal to the reference electrical parameter value, i.e., a first difference between the current electrical parameter value and the reference electrical parameter value is less than or equal to 0. The first stop condition may also set other conditions according to the need, such as ratio, and the like.

In some other embodiments, considering the fluctuation of the electrical parameter value, the first stop condition may set an error range to prevent misjudgment caused by fluctuation. The first stop condition may be: calculating the first difference between the current electrical parameter value and the reference electrical parameter value, the first difference falling into a first error range. For example, S1311 may specifically be: calculating the first difference between the current electrical parameter value and the reference electrical parameter value, and if the first difference does not fall into the first error range, adding 1 to the counting variable, and executing S1312; otherwise, executing S1313. Correspondingly, in S1312, the above S1211 to S1311 are repeated for next lamp bead until the first difference falls into the first error range. The first error range may be set according to the need, for example, the first error range may be set as {−0.2 mA to 0.2 mA} (preset error range α).

In some embodiments, the method for detecting the number of lamp beads, which employs the forward one-by-one turning-on rule, includes:

P1: controlling the lamp beads of the LED lamp bank to be fully turned off, and detecting and recording a current fully-turned off current value of the currently turned off lamp beads;

starting from the first lamp bead,

P2: controlling one lamp bead in the lamp bank to be turned on, and detecting and recording a single-lit current value when the current lamp bead is turned on;

P3: calculating a first difference between the single-lit current value and the fully-turned off current value, and if the first difference is greater than the first error range, adding 1 to the counting variable;

P4: continuously controlling next lamp bead to be turned on, and repeating the above P2 to P3 until the difference falls within a preset error range; and P5: acquiring the current counting variable, and taking the current counting variable as the number of current lamp beads of the LED lamp bank.

For example, an initial value of the counting variable is set as 0. As shown in FIG. 1, there are four LED lamp bars (lamp bank), which are LED lamp bar A 121, LED lamp bar B 122, LED lamp bar C 123 and LED lamp bar D 124 respectively. There are n lamps beads on the LED lamp bar A 121, which are A1, A2, A3, . . . , An respectively, wherein n is a positive integer greater than or equal to 1. There are n lamps beads on the LED lamp bar B 122, which are B1, B2, B3, . . . , Bn respectively, wherein n is a positive integer greater than or equal to 1. There are m lamps beads on the LED lamp bar C 123, which are C1, C2, C3, . . . , Cm respectively, wherein m is a positive integer greater than or equal to 1. There are m lamps beads on the LED lamp bar D 124, which are D1, D2, D3, . . . , Dm respectively, wherein m is a positive integer greater than or equal to 1. When the lighting controller 110 respectively controls the lamp beads of any one of the four LED lamp bars including the LED lamp bar A 121, the LED lamp bar B, the LED lamp bar C and the LED lamp bar D to be fully turned off, a current value after the lamp beads are turned off is recorded as a reference current value $I_{off}$, the lamp beads are controlled to be turned on one by one (in an order from the beginning to the end) by the lighting controller 110, a current of the current lamp bank is detected, and a current value $I_{An}$ of each single-lit lamp bead is recorded. When a difference $I_{An}-I_{off}$ is greater than the first error range α, the counting variable is added by 1 (the initial value of the counting variable is set as 0), and then next lamp bead is turned on again until the difference $I_{An}-I_{off}$ falls into the preset error range α. For example, if the actual number of current lamp beads is 10, the automatic detection process is as follows: controlling a current detection module of the LED lamp bar A to detect a current of the current lamp bead A1 (the first lamp bead), and recording a current value $I_{A1}$ of the single-lit lamp bead A1, when the difference $I_{A1}-I_{off}$ does not fall into the preset error range α, adding 1 to the counting variable, and the counting variable becoming 1; lighting next lamp bead A2 (single-lit second lamp bead) again, and recording a current value $I_{A2}$ of the single-lit lamp bead A2, until lighting next lamp bead A11 in a similar fashion, and recording a current value $I_{A11}$ of the single-lit lamp bead A11. Because the lamp bead A11 does not actually exist, the single-lit lamp bead A11 is equivalent to the situation that the lamp beads in the lamp bank are fully turned off. If the fluctuation factor is excluded, the current value $I_{A1}$ should be about the same as the reference current value $I_{off}$. A difference IA11−Ioff falls into the preset error range α. The current counting variable is recorded as 10, and the current counting variable 10 is taken as the number of current lamp beads of the LED lamp bank, representing that the number of lamp beads of the LED lamp bar A is 10. In a similar fashion, the LED lamp bar B 122, the LED lamp bar C 123 and the LED lamp bar D 124 can be measured, and the number of lamp beads respectively in the LED lamp bar B 122, the LED lamp bar C 123 and the LED lamp bar D 124 can be obtained, thus saving unnecessary labor cost, realizing automatic counting of the number of lamp beads without manually counting the number of lamp beads.

As an optional embodiment, when the preset rule is the forward one-by-one turning-off rule, it is similar to the forward one-by-one turning-on rule, except that the operating state of the lamp beads is operated to be opposite to that of the forward one-by-one extinguishment rule. Correspondingly, the reference electrical parameter value is a fully-lit electrical parameter value, and a current fully-lit current value may be detected and recorded as the reference electrical parameter value by controlling the lamp beads of the LED lamp bank to fully turn on; then, starting from the first lamp bead, one lamp bead in the LED lamp bank to controlled to be turned on, a single-turned off current value when the current lamp bead is turned on, is detected and recorded, and a difference (absolute value) between the single-turned off current value and the fully-turned off current value is calculated; if the difference does not fall into the preset error range, the counting variable is added by 1; next lamp bead is continuously controlled to be separately turned off, and the above steps are repeated until the difference falls within the preset error range; and the current counting variable is acquired, and the current counting variable is taken as the number of current lamp beads of the LED lamp bank.

Figure 8:
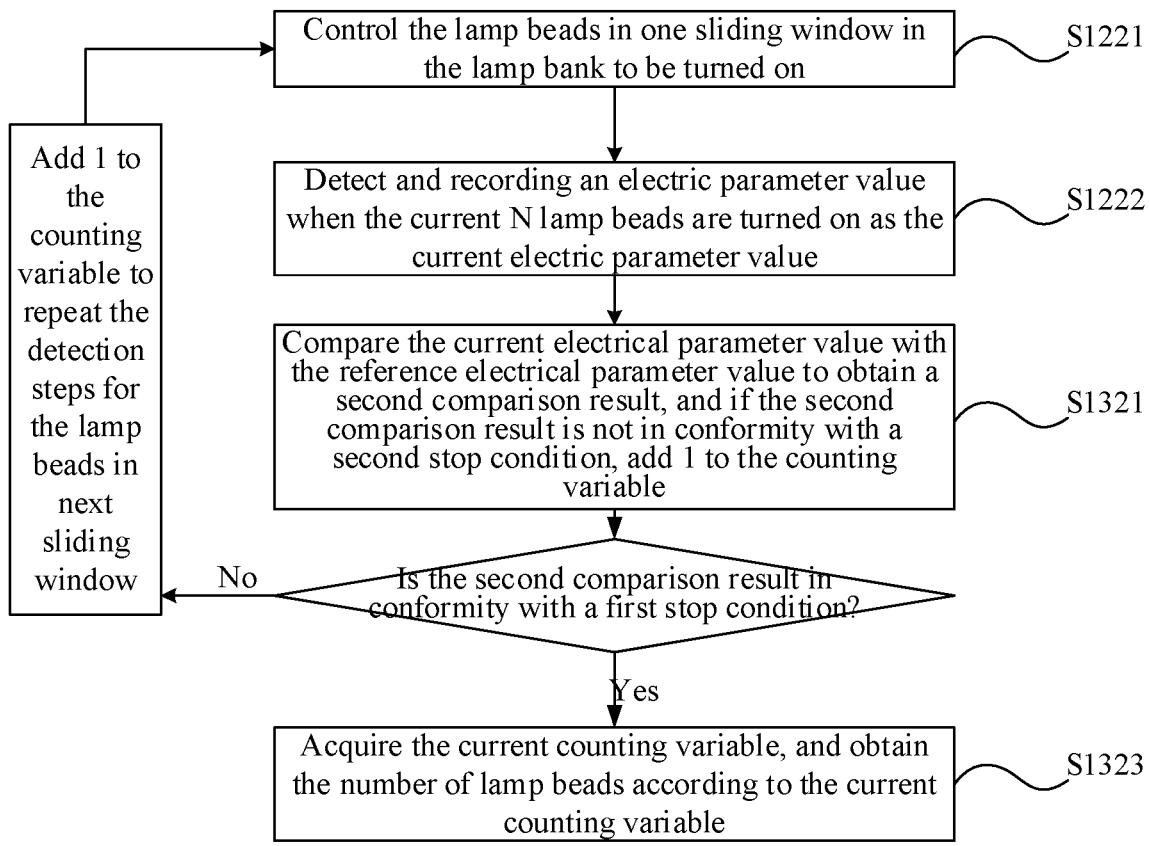
FIG. 8 is a flowchart of a method for detecting a number of lamp beads provided by another embodiment of the present application.

As an optional embodiment, when the preset rule is the forward fixed-length sliding-window turning-on rule;

correspondingly, referring to FIG. 8, the controlling the plurality of lamp beads to be turned on or turned off according to the preset rule, and acquiring the current electrical parameter value of the lamp bank; and obtaining the number of current lamp beads by determining according to the reference electrical parameter value and the current electrical parameter value, include:

S1221: controlling the lamp beads in one sliding window in the lamp bank to be turned on; wherein one sliding window includes N lamp beads, and N is a positive integer greater than or equal to 2;

S1222: detecting and recording an electric parameter value when the current N lamp beads are turned on as the current electric parameter value;

S1321: comparing the current electrical parameter value with the reference electrical parameter value to obtain a second comparison result, and if the second comparison result is not in conformity with a second stop condition, adding 1 to the counting variable, and executing S1322; otherwise, executing S1323;

S1322: repeating the above S1221 to S1321 for the lamp beads in next sliding window until the second comparison result is in conformity with the second stop condition; and S1323: acquiring the current counting variable, and obtaining the number of lamp beads according to the current counting variable.

In some embodiments, because the current value of a single lamp bead is weak, it is easy to misjudge. For example, a current value of a lamp bead in the middle of the lamp bank is small after lighting. If the number of lamp beads is detected by the forward one-by-one turning-on rule, it is easy to misjudge that the current value has fallen into the first error range, which leads to misjudgment. Therefore, in order to avoid this problem, some embodiments of the present application adopt the forward fixed-length sliding-window turning-on rule, that is, N lamp beads are turned on every time, and the current values of the N lamp beads after being overlapped are larger, which can effectively avoid misjudgment.

It is explained by taking N=10 as example below. That is, 10 lamp beads are turned on at a time.

In some embodiments, the reference electrical parameter value of the lamp bank may be acquired by executing S1100 first. For example, acquiring the reference electrical parameter value of the lamp bank includes:

At S1110: controlling the lamp beads of the LED lamp bank to be fully turned off, and detecting and recording a current fully-turned off current value as the reference electrical parameter value.

In some embodiments, S1221 may start from a first lamp bead (generally a lamp bead connected with the lighting controller) of the lamp bank and control the first to the tenth lamp bead in the lamp bank to be turned on; and then determine whether the electrical parameter of the lamp bead is in conformity with the second stop condition by executing S1222 to S1321, and if the electrical parameter of the lamp bead is not in conformity with the second stop condition, light the second to the eleventh lamp bead to detect in a similar fashion till the last lamp bead.

In some embodiments, in S1321, the second stop condition may be that the current electrical parameter value is less than or equal to the reference electrical parameter value, i.e., a second difference between the current electrical parameter value and the reference electrical parameter value is less than or equal to 0. The second stop condition may also set other conditions according to the need, such as ratio, and the like.

In some other embodiments, considering the fluctuation of the electrical parameter value, the second stop condition may set an error range to prevent misjudgment caused by fluctuation. The second stop condition may be: calculating the second difference between the current electrical parameter value and the reference electrical parameter value, the second difference falling into a second error range. For example, S1321 may specifically be: calculating the second difference between the current electrical parameter value and the reference electrical parameter value, and if the second difference does not fall into the second error range, adding 1 to the counting variable, and executing S1322; otherwise, executing S1323. Correspondingly, in S1322, the above S1221 to S1321 are repeated for next lamp bead until the second difference falls into the second error range. The second error range may be set according to the need, for example, the second error range may be set as {−0.2 mA to 0.2 mA} (preset error range α).

For example, an initial value of the counting variable is set as 0, an LED lamp bar (lamp bank) to be detected is LED lamp bar A 121, and the lamp beads on the LED lamp bar A 121 are A1, A2, A3, . . . , An respectively. There are n light beads in total. When the lighting controller 110 respectively controls the lamp beads of the LED lamp bar A 121 to be fully turned off, a current value after the lamp beads are turned off is recorded as a reference current value $I_{off}$, the lamp beads in each sliding window are controlled to be turned on (in an order from the beginning to the end) by the lighting controller 110, a current of the current lamp bank is detected, and a current value $I_{An}$ of the sliding window is recorded. When a difference $I_{An}-I_{off}$ is greater than the second error range α, the counting variable is added by 1 (the initial value of the counting variable is set as 0), and then the lamp beads in next sliding window are turned on again until the difference $I_{An}-I_{off}$ falls into the preset error range α. For example, if the actual number of current lamp beads is 20, the automatic detection process is as follows: controlling a current detection module of the LED lamp bar A to detect currents of the current lamp beads A1 to A10 (the lamp beads in a first sliding window), and recording a current value $I_{A1}$, when the difference $I_{A1}-I_{off}$ does not fall into the preset error range α, adding 1 to the counting variable, and the counting variable becoming 1; lighting lamp beads A2 to A11 in next sliding window (the lamp beads in a second sliding window) again, and recording a current value $I_{A2}$, until lighting the lamp beads A21 to A31 in the 21$^{st}$ sliding window in a similar fashion, and recording current values $I_{A21}$ of the lamp beads A21 to A31 in the 21$^{st}$ sliding window. Because the lamp beads A21 to A31 do not actually exist, lighting the lamp beads A2 to A11 in the sliding window is equivalent to the situation that the lamp beads in the lamp bank are fully turned off. If the fluctuation factor is excluded, the current value $I_{A21}$ should be about the same as the reference current value $I_{off}$. A difference $I_{A21}-I_{off}$ falls into the preset error range α. The current counting variable is recorded as 20, and the current counting variable 20 is taken as the number of current lamp beads of the LED lamp bank, representing that the number of lamp beads of the LED lamp bar A is 20. In this way, even if the detection and determination are misjudged due to the small current value of a single lamp bead, in the worst case, the misjudgment may only occur in the last one or two lamp beads, and there will be no large deviation in the detection of the number of lamp beads.

As an optional embodiment, when the preset rule is the forward fixed-length sliding-window turning-off rule, it is similar to the forward fixed-length sliding-window turning-on rule, except that the operating state of the lamp beads is operated to be opposite to that of the forward fixed-length sliding-window turning-on rule. Correspondingly, the reference electrical parameter value is a fully-lit electrical parameter value, and a current fully-lit current value may be detected and recorded as the reference electrical parameter value by controlling the lamp beads of the LED lamp bank to fully turn on; then, starting from the first sliding window, one sliding window in the LED lamp bank to controlled to be turned on, an turned off current value when the lamp bead in the current sliding window is turned on, is detected and recorded, and a difference (absolute value) between the turned off current value and the fully-turned off current value is calculated; if the difference does not fall into the preset error range, the counting variable is added by 1; next lamp bead is continuously controlled to be separately turned off, and the above steps are repeated until the difference falls within the preset error range; and the current counting variable is acquired, and the current counting variable is taken as the number of the current lamp beads of the LED lamp bank.

Figure 9:
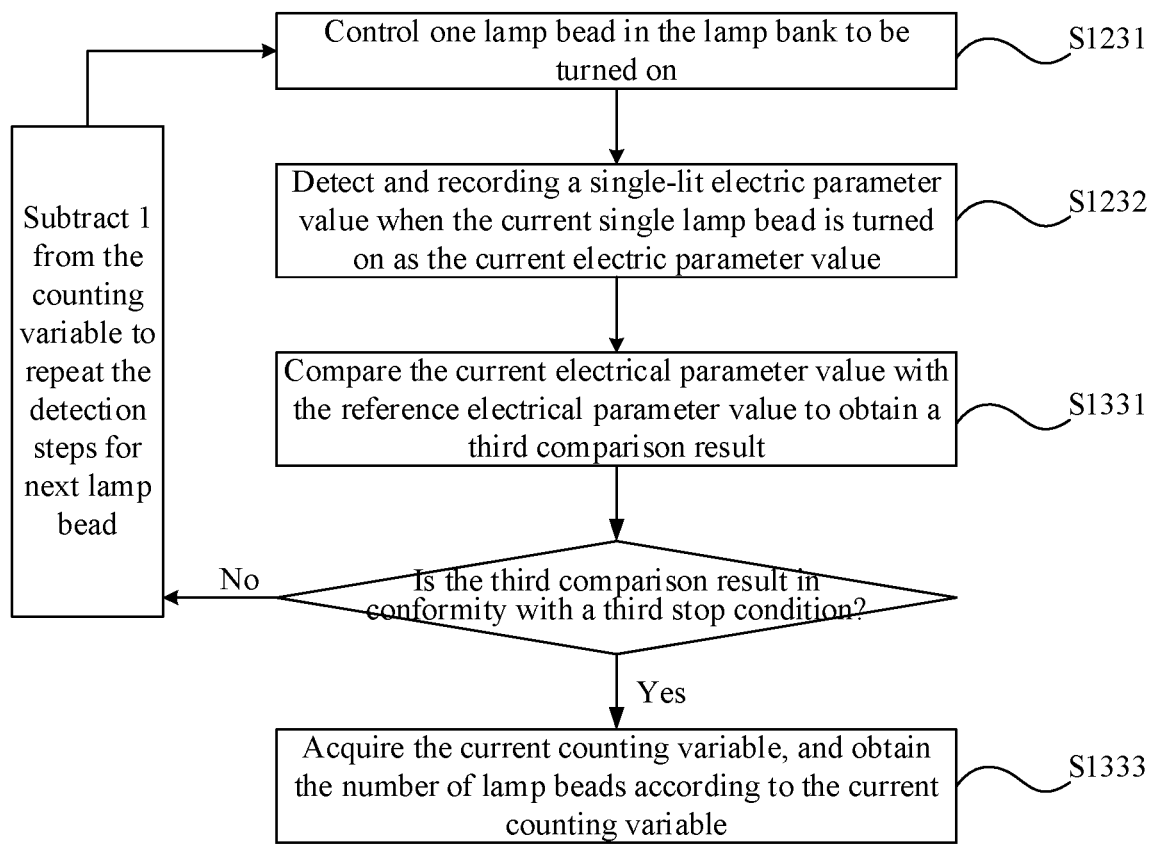
FIG. 9 is a flowchart of a method for detecting a number of lamp beads provided by another embodiment of the present application.

As an optional embodiment, when the preset rule is the backward one-by-one turning-on rule;

correspondingly, referring to FIG. 9, the controlling the plurality of lamp beads to be turned on or turned off according to the preset rule, and acquiring the current electrical parameter value of the lamp bank; and obtaining the number of current lamp beads by determining according to the reference electrical parameter value and the current electrical parameter value, include:

S1231: starting from the preset lamp bead with the maximum number len_max to control one lamp bead in the lamp bank to be turned on;

S1232: detecting and recording an electric parameter value when the current single lamp bead is turned on as the current electric parameter value;

S1331: comparing the current electrical parameter value with the reference electrical parameter value to obtain a third comparison result, and if the third comparison result is not in conformity with a third stop condition, subtracting 1 from the counting variable, and executing S1332; otherwise, executing S1333; wherein, an initial value of the counting variable is the preset maximum number len_max;

S1332: repeating the above S1231 to S1331 for previous lamp bead until the third comparison result is in conformity with the third stop condition; and S1333: acquiring the current counting variable, and obtaining the number of lamp beads according to the current counting variable.

In some embodiments, backward (opposite to forward) detection may also be adopted. This method needs to set the lamp bead with the maximum number first. For example, the lamp bead with the maximum number is 100, which may turn on backward one by one from the maximum 100 to detect the actual number of lamp beads.

In some embodiments, the reference electrical parameter value of the lamp bank may be acquired by executing S1100 first. For example, acquiring the reference electrical parameter value of the lamp bank includes:

S1110: controlling the lamp beads of the LED lamp bank to be fully turned off, and detecting and recording a current fully-turned off current value as the reference electrical parameter value.

In some embodiments, S1231 may start from the lamp bead with the maximum number in the lamp bank to control the $100^{th}$ lamp bead in the lamp bank to be turned on; then determine whether the electrical parameter of the lamp bead is in conformity with the third stop condition by executing S1232 to S1331, and if the electrical parameter of the lamp bead is not in conformity with the third stop condition, light the $299^{th}$ lamp bead to detect in a similar fashion until the electrical parameter of the lamp bead is in conformity with the third stop condition.

In some embodiments, in S1331, the third stop condition may be that the current electrical parameter value is greater than the reference electrical parameter value, i.e., a third difference between the current electrical parameter value and the reference electrical parameter value is greater than 0. The third stop condition may also set other conditions according to the need, such as ratio, and the like.

In some other embodiments, considering the fluctuation of the electrical parameter value, the third stop condition may set an error range to prevent misjudgment caused by fluctuation. The third stop condition may be: calculating the third difference between the current electrical parameter value and the reference electrical parameter value, the third difference not falling into a third error range. For example, S1331 may specifically be: calculating the third difference between the current electrical parameter value and the reference electrical parameter value, and if the third difference falls into the third error range, subtracting 1 from the counting variable, and executing S1332; otherwise, executing S1333. Correspondingly, in S1332, the above steps S1231 to S1331 are repeated for next lamp bead until the third difference does not fall into the third error range. The third error range may be set according to the need, for example, the third error range may be set as {−0.2 mA to 0.2 mA} (preset error range α).

For example, an initial value of the counting variable is set as 100, an LED lamp bar (lamp bank) to be detected is LED lamp bar A 121, and the lamp beads on the LED lamp bar A 121 are A1, A2, A3, . . . , An respectively. There are n light beads in total. When the lighting controller 110 respectively controls the lamp beads of the LED lamp bar A 121 to be fully turned off, a current value after the lamp beads are turned off is recorded as a reference current value $I_{off}$, the lamp beads are controlled to be turned on one by one (in an order from the beginning to the end) by the lighting controller 110, a current of the current lamp bank is detected, and a current value $I_{An}$ of the single-lit lamp bead is recorded. When a difference $I_{An}-I_{off}$ falls into the third error range α, the counting variable is subtracted by 1 (the initial value of the counting variable is set as 100), and then the previous lamp bead is turned on again until the difference $I_{An}-I_{off}$ does not fall into the preset error range α. For example, if the actual number of current lamp beads is 90, the automatic detection process is as follows: controlling a current detection module of the LED lamp bar A to detect a current of the current lamp bead A100 (the lamp bead with the maximum number), and recording a current value $I_{A100}$. Because the lamp bead A100 does not actually exist, the single-lit lamp bead A100 is equivalent to the situation that the lamp beads in the lamp bank are fully turned off. If the fluctuation factor is excluded, the current value $I_{A100}$ should be about the same as the reference current value $I_{off}$. If the difference $I_{A1}-I_{off}$ falls into the preset error range α, the counting variable is subtracted by 1, and the counting variable becomes 99. The previous lamp bead A99 is turned on again, and a current value $I_{A99}$ is recorded, until lighting the $90^{th}$ lamp bead A90 in a similar fashion, and a current value $I_{A90}$ of the single-lit lamp bead A90 is recorded. Because the lamp bead A90 actually exists, a difference $I_{A90}-I_{off}$ does not fall into the error range α. The current counting variable is recorded as 90, and the current counting variable 90 is taken as the number of current lamp beads of the LED lamp bank, representing that the number of lamp beads of the LED lamp bar A is 90. In this way, even if the detection and determination are misjudged due to the small current value of a single lamp bead, in the worst case, the misjudgment may only occur in the last one or two lamp beads, and there will be no large deviation in the detection of the number of lamp beads.

Figure 10:
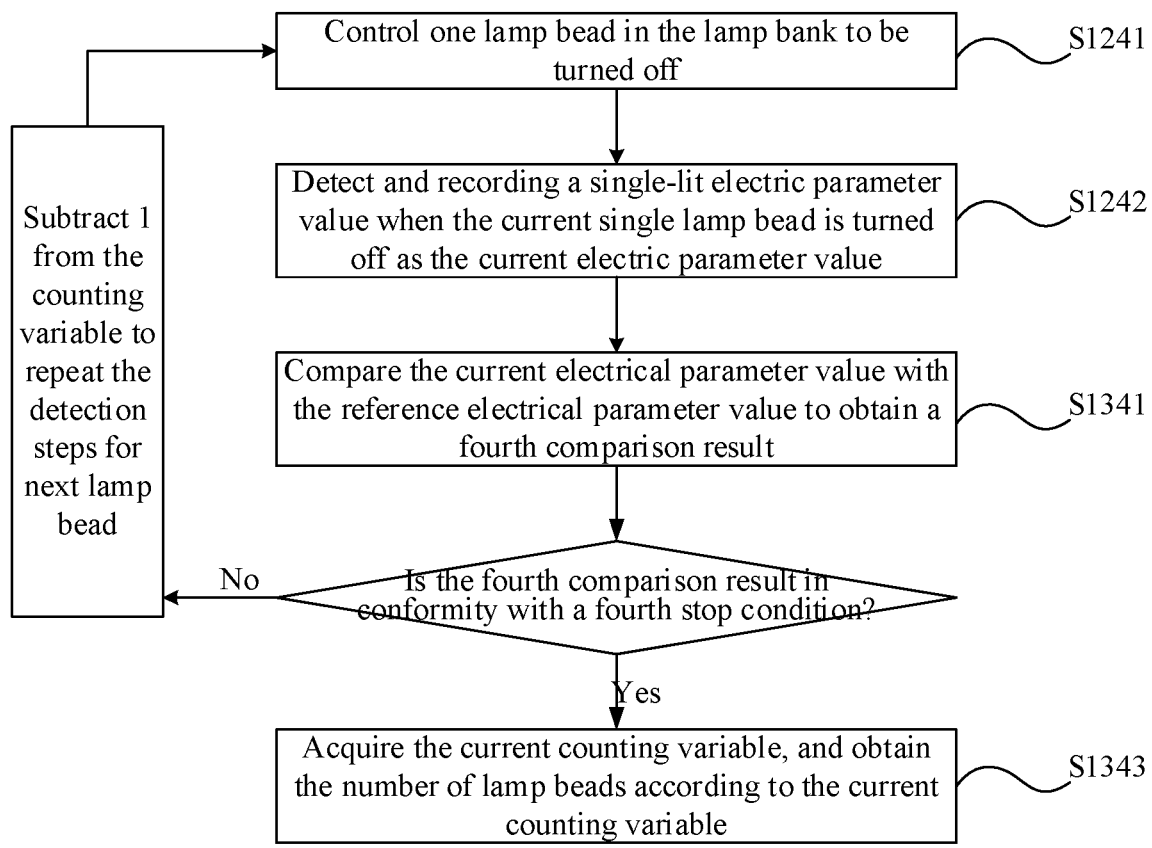
FIG. 10 is a flowchart of a method for detecting a number of lamp beads provided by another embodiment of the present application.

As an optional embodiment, when the preset rule is the backward one-by-one turning-off rule;

correspondingly, the reference electrical parameter value includes a fully-lit electrical parameter value;

correspondingly, referring to FIG. 10, the acquiring the reference electrical parameter value of the lamp bank, includes:

S1110: controlling the lamp bank to be fully lit, and acquiring the fully-lit electrical parameter value; and correspondingly, the controlling the plurality of lamp beads to be turned on or turned off according to the preset rule, and acquiring the current electrical parameter value of the lamp bank; and obtaining the number of current lamp beads by determining according to the reference electrical parameter value and the current electrical parameter value, include:

S1241: starting from the preset lamp bead with the maximum number len_max to control one lamp bead in the lamp bank to turn off;

S1242: detecting and recording an electric parameter value when the current single lamp bead is turned off as the current electric parameter value;

S1341: comparing the current electrical parameter value with the reference electrical parameter value to obtain a fourth comparison result, and if the fourth comparison result is not in conformity with a fourth stop condition, subtracting 1 from the counting variable, and executing S1342; otherwise, executing S1343; wherein, an initial value of the counting variable is the preset maximum number len_max;

S1342: repeating the above steps S1241 to S1341 for the previous lamp bead until the fourth comparison result is in conformity with the fourth stop condition; and S1343: acquiring the current counting variable, and obtaining the number of lamp beads according to the current counting variable.

In some embodiments, backward (opposite to forward) detection of one-by-one extinguishing may also be adopted. This method needs to set the lamp bead with the maximum number first. For example, the lamp bead with the maximum number is 100, which may turn on backward one by one from the maximum 100 to detect the actual number of lamp beads.

In some embodiments, the reference electrical parameter value of the lamp bank may be acquired by executing S1100 first. For example, acquiring the reference electrical parameter value of the lamp bank includes:

S1110: controlling the lamp beads of the LED lamp bank to be fully lit, and detecting and recording a current fully-lit current value as the reference electrical parameter value.

In some embodiments, S1241 may start from the lamp bead with the maximum number in the lamp bank to control the $100^{th}$ lamp bead in the lamp bank to be turned on; then determine whether the electrical parameter of the lamp bead is in conformity with the fourth stop condition by executing steps S1242 to S1341, and if the electrical parameter of the lamp bead is not in conformity with the fourth stop condition, light the $299^{th}$ lamp bead to detect in a similar fashion until the electrical parameter of the lamp bead is in conformity with the fourth stop condition.

In some embodiments, in S1341, the fourth stop condition may be that the current electrical parameter value is less than the reference electrical parameter value, i.e., a fourth difference between the current electrical parameter value and the reference electrical parameter value is less than 0. The fourth stop condition may also set other conditions according to the need, such as ratio, and the like.

In some other embodiments, considering the fluctuation of the electrical parameter value, the fourth stop condition may set an error range to prevent misjudgment caused by fluctuation. The fourth stop condition may be: calculating the fourth difference between the current electrical parameter value and the reference electrical parameter value, the fourth difference not falling into a fourth error range. For example, S1341 may specifically be: calculating the fourth difference between the current electrical parameter value and the reference electrical parameter value, and if the fourth difference falls into the fourth error range, subtracting 1 from the counting variable, and executing S1342; otherwise, executing S1343. Correspondingly, in S1342, the above steps S1241 to S1341 are repeated for next lamp bead until the fourth difference does not fall into the fourth error range. The fourth error range may be set according to the need, for example, the error range error range may be set as {−0.2 mA to 0.2 mA} (preset error range α).

For example, an initial value of the counting variable is set as 100, an LED lamp bar (lamp bank) to be detected is LED lamp bar A 121, and the lamp beads on the LED lamp bar A 121 are A1, A2, A3, . . . , An respectively. There are n light beads in total. When the lighting controller 110 respectively controls the lamp beads of the LED lamp bar A 121 to be fully turned off, a current value after the lamp beads are fully lit is recorded as a reference current value $I_{on}$, the lamp beads are controlled to be turned on one by one (in an order from the beginning to the end) by the lighting controller 110, a current of the current lamp bank is detected, and a current value $I_{An}$ of the single-turned off lamp bead is recorded. When a difference $I_{An}-I_{on}$ falls into the fourth error range α, the counting variable is subtracted by 1 (the initial value of the counting variable is set as 100), and then the lamp beads in the previous sliding window are turned on again until the difference $I_{An}-I_{on}$ does not fall into the error range α. For example, if the actual number of current lamp beads is 90, the automatic detection process is as follows: controlling a current detection module of the LED lamp bar A to detect a current of the current lamp bead A100 (the lamp bead with the maximum number), and recording a current value $I_{A100}$. Because the lamp bead A100 does not actually exist, the single-turned off lamp bead A100 is equivalent to the situation that the lamp beads in the lamp bank are fully lit. If the fluctuation factor is excluded, the current value $I_{A100}$ should be about the same as the reference current value $I_{off}$. If the difference $I_{A1}-I_{on}$ falls into the preset error range α, the counting variable is subtracted by 1, and the counting variable becomes 99. The previous lamp bead A99 is turned on again, and a value $I_{A99}$ is recorded, until lighting the $90^{th}$ lamp bead A90 in a similar fashion, and a current value $I_{A90}$ of the single-lit lamp bead A90 is recorded. Because the lamp bead A90 actually exists, a difference $I_{A90}-I_{on}$ does not fall into the error range α, and the fourth stop condition is satisfied. The current counting variable is recorded as 90, and the current counting variable 90 is taken as the number of current lamp beads of the LED lamp bank, representing that the number of lamp beads of the LED lamp bar A is 90. In this way, even if the detection and determination are misjudged due to the small current value of a single lamp bead, in the worst case, the misjudgment may only occur in the last one or two lamp beads, and there will be no large deviation in the detection of the number of lamp beads.

Figure 11:
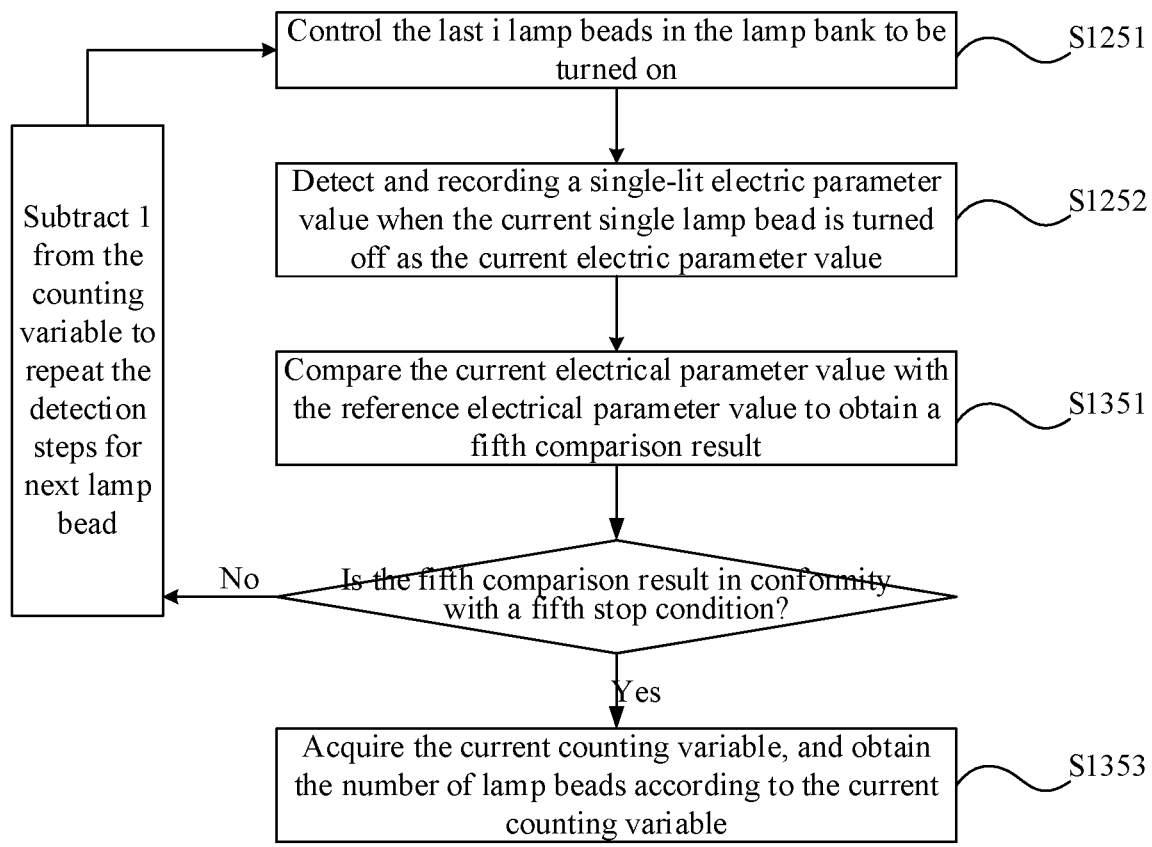
FIG. 11 is a flowchart of a method for detecting a number of lamp beads provided by another embodiment of the present application.

As an optional embodiment, when the preset rule is the backward cumulative turning-on rule;

correspondingly, referring to FIG. 11, the controlling the plurality of lamp beads to be turned on or turned off according to the preset rule, and acquiring the current electrical parameter value of the lamp bank; and obtaining the number of current lamp beads by determining according to the reference electrical parameter value and the current electrical parameter value, include:

S1251: starting from the preset lamp bead with the maximum number len_max to control the last i lamp beads in the lamp bank to be turned on; wherein, an initial value of i is 1;

S1252: detecting and recording an electric parameter value when the current single lamp bead is turned off as the current electric parameter value;

S1351: comparing the current electrical parameter value with the reference electrical parameter value to obtain a fifth comparison result, and if the fifth comparison result is not in conformity with a fifth stop condition, subtracting 1 from the counting variable, and letting i=i+1; and executing S1352; otherwise, executing S1353; wherein, an initial value of the counting variable is the preset maximum number len_max;

S1352: repeating the above steps S1251 to S1351 until the fifth comparison result is in conformity with the fifth stop condition; and S1353: acquiring the current counting variable, and obtaining the number of lamp beads according to the current counting variable.

In some embodiments, backward (opposite to forward) detection of cumulative lighting may also be adopted. This method needs to set the lamp bead with the maximum number first. For example, the lamp bead with the maximum number is 100, which may turn on backward one by one from the maximum 100 to detect the actual number of lamp beads. It should be noted that i is used to refer to the cumulative number of lit lamp beads, for example, when i=1, the last lamp bead (the lamp bead with the maximum number len_max) is turned on, when i=2, the last two lamp beads (the last one and the second from the bottom) are turned on, and when i=3, the last three lamp beads (the last one, the second from the bottom and the third from the bottom) are turned on, . . . , and so on.

In some embodiments, the reference electrical parameter value of the lamp bank may be acquired by executing S1100 first. For example, acquiring the reference electrical parameter value of the lamp bank includes:

S1110: controlling the lamp beads of the LED lamp bank to be fully turned off, and detecting and recording a current fully-turned off current value as the reference electrical parameter value.

In some embodiments, S1251 may start from the lamp bead in the lamp bank with the maximum number to control the $100^{th}$ lamp bead in the lamp bank to be turned on; then determine whether the electrical parameter of the lamp bead is in conformity with the fifth stop condition by executing steps S1252 to S1351, and if the electrical parameter of the lamp bead is not in conformity with the fifth stop condition, light the $299^{th}$ lamp bead to detect in a similar fashion until the electrical parameter of the lamp bead is in conformity with the fifth stop condition.

In some embodiments, in S1351, the fifth stop condition may be that the current electrical parameter value is greater than the reference electrical parameter value, i.e., a fifth difference between the current electrical parameter value and the reference electrical parameter value is greater than 0. The fifth stop condition may also set other conditions according to the need, such as ratio, and the like.

In some other embodiments, considering the fluctuation of the electrical parameter value, the fifth stop condition may set an error range to prevent misjudgment caused by fluctuation. The fifth stop condition may be: calculating the fifth difference between the current electrical parameter value and the reference electrical parameter value, the fifth difference not falling into a fifth error range. For example, S1351 may specifically be: calculating the fifth difference between the current electrical parameter value and the reference electrical parameter value, and if the fifth difference falls into the fifth error range, subtracting 1 from the counting variable, and executing S1352; otherwise, executing S1353; Correspondingly, in S1352, the above S1251 to S1351 are repeated for next lamp bead until the fifth difference does not fall into the fifth error range. The fifth error range may be set according to the need, for example, the fifth error range may be set as {−0.2 mA to 0.2 mA} (preset error range α).

For example, an initial value of the counting variable is set as 100, an LED lamp bar (lamp bank) to be detected is LED lamp bar A 121, and the lamp beads on the LED lamp bar A 121 are A1, A2, A3, . . . , An respectively. There are n light beads in total. When the lighting controller 110 respectively controls the lamp beads of the LED lamp bar A 121 to be fully turned off, a current value after the lamp beads are fully-turned off is recorded as a reference current value $I_{off}$, the lamp beads are controlled to be turned on in a cumulative manner (in an order from the end to the beginning) by the lighting controller 110, a current of the current lamp bank is detected, and a current value $I_{An}$ of the lamp beads lit in a cumulative manner is recorded. When a difference $I_{An}-I_{off}$ falls into the fifth error range α, the counting variable is subtracted by 1 (the initial value of the counting variable is set as 100), and then the lamp beads in the previous sliding window are turned on again until the difference $I_{An}-I_{off}$ does not fall into the error range α. For example, if the actual number of current lamp beads is 90, the automatic detection process is as follows: controlling a current detection module of the LED lamp bar A to detect a current of the current lamp bead A100 (the lamp bead with the maximum number), and recording a current value $I_{A100}$. Because the lamp bead A100 does not actually exist, lighting the lamp bead A100 is equivalent to the situation that the lamp beads in the lamp bank are fully turned off. If the fluctuation factor is excluded, the current value $I_{A100}$ should be about the same as the reference current value $I_{off}$. If the difference $I_{A1}-I_{off}$ falls into the preset error range α, the counting variable is subtracted by 1, and the counting variable becomes 99. The previous lamp bead A99 is turned on again in a cumulative manner (that is, the lamp bead A100 and the lamp bead A99 are turned on at the same time), and a current value $I_{A99}$ is recorded until the $90^{th}$ lamp bead A90 is turned on in a similar fashion, and a current value $I_{A90}$ of the current value A90 lit in a cumulative manner (that is, the lamp bead A100 and the lamp bead A99 are turned on at the same time) is recorded. Because the lamp bead A90 actually exists, a difference $I_{A90}-I_{off}$ does not fall into the error range α, and the fifth stop condition is satisfied. The current counting variable is recorded as 90, and the current counting variable 90 is taken as the number of current lamp beads of the LED lamp bank, representing that the number of lamp beads of the LED lamp bar A is 90. In this way, even if the detection and determination are misjudged due to the small current value of a single lamp bead, in the worst case, the misjudgment may only occur in the last one or two lamp beads, and there will be no large deviation in the detection of the number of lamp beads.

In addition, referring to the forward fixed-length sliding-window turning-on rule and the forward fixed-length sliding-window turning-off rule, the implementation principles of the backward fixed-length sliding-window turning-on rule and the backward fixed-length sliding-window turning-off rule are similar and will not be elaborated here.

Compared with the existing technology, the method for detecting the number of lamp beads provided by the embodiment of the present application according to the first aspect compares the electrical parameter detected when the lamp bank is turned on or turned off according to the preset rule with the reference electrical parameter, and intelligently determines the number of lamp beads currently possessed by the lamp bank according to the comparison result, thereby realizing the automatic counting of the number of lamp beads, thus realizing length detection of the lamp bank, further facilitating the standardized design of the lamp bank and facilitating the production, sales and use of the lighting module.

In addition, the present application further provides a lighting controller, including: a memory, a processor and a computer program stored in the memory and executable by the processor, wherein the data processing program, when executed by the processor, causes the processor to perform the method for detecting the number of lamp beads according to the first aspect.

The memory may be a built-in memory or an external memory. The processor may include a plurality of processing units. The processor and the memory may be connected by a bus or other means.

As a non-transitory computer-readable storage medium, the memory may be used to store non-transitory software programs and non-transitory computer-executable programs. In addition, the memory may include a high-speed random access memory, and may also include a non-transitory memory, such as at least one disk memory device, a flash memory device, or other non-transitory solid storage devices. In some optional embodiments, the memory may optionally include memories remotely located with respect to the processor, and these remote memories may be connected to the processor via networks. Examples of the networks above include, but are not limited to, the Internet, intranet, local area networks, mobile communication networks, and combinations thereof.

It should be noted that, the lighting controller in this embodiment may be applied to the system architecture of the embodiment shown in FIG. 1, and the lighting controller in this embodiment and the light control apparatus in the system architecture of the embodiment shown in FIG. 1 have the same inventive concept, so these embodiments have the same implementation principles and technical effects, and will not be described in detail here.

Non-transitory software programs and instructions required to realize the method for detecting the number of lamp beads of the foregoing embodiments are stored in the memory, and when being executed by the processor, execute the method for detecting the number of lamp beads in the foregoing embodiments, for example, executing the method S1100 to S1300 in FIG. 6, the method S1211 to S1313 in FIG. 7, the method S1221 to S1323 in FIG. 8, the method S1231 to S1333 in FIG. 9, the method S1241 to S1343 in FIG. 10, and the method S1251 to S1353 in FIG. 11 described above.

Figure 12:
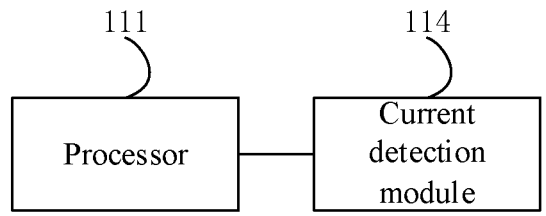
FIG. 12 is a schematic diagram of a circuit structure of a lighting controller provided by an embodiment of the present application.

As for the lighting module 100 in some embodiments, referring to FIG. 12, the lighting controller 110 includes a 111 and a current detection module 114. The current detection module 114 is connected with the processor 111 and used to detect a power supply current of the lighting module 100 and transmit the detected power supply current to the processor 111, so that the processor 111 can detect the lighting module 100 and control the lighting module 100 according to the detected result. On one hand, the current detection module 114 is used to ensure the stability and reliability of the power supply current, thus protecting the lighting module 100; and on the other hand, may be used to help realize the automatic detection algorithm of the number of lamp beads 130 as described above.

In some embodiments, referring to FIG. 11, an output end of an operational amplifier U16A in the current detection module 114 is connected with a terminal I_ADC_IN, and the terminal I_ADC_IN is connected with a signal input pin of a processing chip (processor 111) for transmitting the detected current to the processing chip (processor 111) through the signal input pin of the processing chip (processor 111), so that the processor 111 can count the number of lamp beads 130 of each lamp bank according to the current signal.

This embodiment can realize the control of the lighting controller 110 on the specific display of the lighting module 100, that is, the determination of the number of lamp beads 130 in specific applications.

In some embodiments, in the above embodiments, the number of lamp beads 130 is determined by current detection (please refer to the automatic lamp bead number detection algorithm provided in the above embodiments, which will not be described here), because the user can avoid the mismatch between the number of control signal data sent by the lighting controller 110 and the number of lamp beads due to the difference of scenario sizes when installing the lamp bank.

In some embodiments, WS2812 series chips or WS2813 series chips are employed as the lamp beads 130 (smart integrated LED light source) in the LED lamp bank 100.

In some embodiments, the lamp bead 130 of WS2812 series chips (such as WS2812B) is formed by integrating a control circuit and an RGB chip in a 5050 packaged device to form a complete external control pixel. Any pixel receives a signal and then outputs the signal after waveform shaping, which ensures that circuit waveform distortion will not accumulate. Moreover, power-on reset and power-off reset circuits are built in, and 256 brightness display of the three primary colors RGB of each pixel can be realized to complete full-color display of 16,777,216 colors, with a scanning frequency no less than 400 Hz/s. Moreover, a serial cascade interface can receive and decode data through one signal line, and no circuit is needed when the transmission distance between any two points is no more than 3 m.

According to the embodiments of the present application, the lamp beads of WS2812 series chips are selected, which can make the control of the lamp bank by the lighting controller simpler and more efficient, and improve the detection efficiency and reliability.

According to the embodiment of the present application, the video data information from the video source device is acquired, and the corresponding light control signal is generated according to the video data information to control the operating state of the lamp bank to match the video data information, so that the operating state of the lamp bank changes with the change of the video data information, thereby improving the flexibility and the adaptability of the control mode of the lighting device and improving the user experience.

Moreover, the present application further provides a computer-readable storage medium storing a computer-executable instruction, wherein the program instruction, when executed by a processor, implements the method for detecting the number of lamp beads mentioned above. For example, when being executed by one processor in the lighting controller embodiments mentioned above, the above-mentioned processor is enabled to execute the method for detecting the number of lamp beads of the foregoing embodiments, for example, executing the method S1100 to S1300 in FIG. 6, the method S1211 to S1313 in FIG. 7, the method S1221 to S1323 in FIG. 8, the method S1231 to S1333 in FIG. 9, the method S1241 to S1343 in FIG. 10, and the method S1251 to S1353 in FIG. 11 described above.

Those of ordinary skills in the art will appreciate that all or some of the steps and systems in the methods disclosed above may be implemented as software, firmware, hardware, and suitable combinations thereof. Some physical components or all of the physical components may be implemented as software executed by a processor, such as a central processing unit, a digital signal processor or a microprocessor, or implemented as hardware, or implemented as an integrated circuit, such as an application specific integrated circuit. Such software may be distributed on a computer-readable medium, which may include a computer storage medium (or non-transitory medium) and a communication medium (or transitory medium). As well known to those of ordinary skills in the art, the term computer storage medium includes volatile and non-volatile, removable and non-removable media implemented in any method or art for storing information (such as computer-readable instruction, data structure, programming module or other data). The computer storage medium includes, but is not limited to, RAM, ROM, EEPROM, flash memory or other memory technology, CD-ROM, digital versatile disc (DVD) or other optical disc memory, magnetic cassette, magnetic tape, magnetic disk memory or other magnetic memory device, or may be any other medium that can be used to store the desired information and can be accessed by a computer. Moreover, it is well known to those of ordinary skills in the art that the communication medium typically includes computer-readable instructions, data structures, program modules, or other data in a modulated data signal, such as a carrier wave or other transmission mechanism, and may include any information delivery medium.

The foregoing describes the preferred embodiments of the present application in detail, but the embodiments of the present application are not limited to the foregoing embodiments. Those skilled in the art can make various equal deformations or replacements without departing from the spirit of the embodiments of the present application, and these equal deformations or replacements shall all fall within the scope limited by the claims of the embodiments of the present application.

The invention claimed is:

1. A method for detecting a number of lamp beads, applied to a lighting controller, wherein the lighting controller is in communication connection with a lamp bank, the lamp bank comprises a plurality of lamp beads connected in sequence, and the method comprises:
   acquiring a reference electrical parameter value of the lamp bank;
   controlling the plurality of lamp beads to be turned on or turned off according to a preset rule, and acquiring a current electrical parameter value of the lamp bank; and
   determining the number of current lamp beads according to the reference electrical parameter value and the current electrical parameter value.

2. The method of claim 1, wherein the preset rule is: changing a combination or a position of turning on or turning off of the lamp beads in the lamp bank in turn; and
   correspondingly, determining the number of current lamp beads according to the reference electrical parameter value and the current electrical parameter value comprises:
   comparing the current electrical parameter value with the reference electrical parameter value to obtain a comparison result, and in response to the comparison result being not in conformity with a stop condition, adjusting a counting variable;
   changing the combination or the position of turning on or turning off of the lamp beads in the lamp bank, and repeating the above steps until the comparison result is in conformity with the stop condition; and
   acquiring a current counting variable, and obtaining the number of lamp beads according to the current counting variable.

3. The method of claim 2, wherein the preset rule comprises at least one of the followings: a forward one-by-one turning-on rule, a forward one-by-one turning-off rule, a forward fixed-length sliding-window turning-on rule, a forward fixed-length sliding window turning-off rule, a backward one-by-one turning-on rule, a backward one-by-one turning-off rule, a backward fixed-length sliding-window turning-on rule, a backward fixed-length sliding-window turning-off rule, and a backward cumulative turning-on rule.

4. The method of claim 1, wherein the reference electrical parameter value comprises a fully-turned off electrical parameter value or a fully-lit electrical parameter value or a partially-lit electrical parameter value.

5. The method of claim 3, wherein when the preset rule is the forward one-by-one turning-on rule;
   correspondingly, the controlling the plurality of lamp beads to be turned on or turned off according to the preset rule, and acquiring the current electrical parameter value of the lamp bank; and determining the number of the current lamp beads according to the reference electrical parameter value and the current electrical parameter value, comprise:
   controlling one lamp bead in the lamp bank to be turned on;
   detecting and recording a single-lit electric parameter value when the current lamp bead is turned on as the current electric parameter value;
   comparing the current electrical parameter value with the reference electrical parameter value to obtain a first comparison result, and in response to the first comparison result being not in conformity with a first stop condition, adding 1 to the counting variable;
   repeating the above steps for next lamp bead until the first comparison result is in conformity with the first stop condition; and
   acquiring the current counting variable, and obtaining the number of lamp beads according to the current counting variable.

6. The method of claim 3, wherein when the preset rule is the forward fixed-length sliding-window turning-on rule;
   correspondingly, the controlling the plurality of lamp beads to be turned on or turned off according to the preset rule, and acquiring the current electrical parameter value of the lamp bank; and determining the number of the current lamp beads according to the reference electrical parameter value and the current electrical parameter value, comprise:
   controlling the lamp beads in one sliding window in the lamp bank to be turned on; wherein one sliding window comprises N lamp beads, and N is a positive integer greater than or equal to 2;
   detecting and recording an electric parameter value when the current N lamp beads are turned on as the current electric parameter value;
   comparing the current electrical parameter value with the reference electrical parameter value to obtain a second comparison result, and in response to the second comparison result being not in conformity with a second stop condition, adding 1 to the counting variable;
   repeating the above steps for the lamp beads in next sliding window until the second comparison result is in conformity with the second stop condition; and
   acquiring the current counting variable, and obtaining the number of lamp beads according to the current counting variable.

7. The method of claim 3, wherein when the preset rule is the backward one-by-one turning-on rule;
   correspondingly, the controlling the plurality of lamp beads to be turned on or turned off according to the preset rule, and acquiring the current electrical parameter value of the lamp bank; and determining the number of the current lamp beads according to the reference electrical parameter value and the current electrical parameter value, comprise:

starting from the preset lamp bead with the maximum number to control one lamp bead in the lamp bank to be turned on;

detecting and recording an electric parameter value when the current single lamp bead is turned on as the current electric parameter value;

comparing the current electrical parameter value with the reference electrical parameter value to obtain a third comparison result, and in response to the third comparison result being not in conformity with a third stop condition, subtracting 1 from the counting variable; wherein, an initial value of the counting variable is the preset maximum number;

repeating the above steps for the previous lamp bead until the third comparison result is in conformity with the third stop condition; and acquiring the current counting variable, and obtaining the number of lamp beads according to the current counting variable.

8. The method of claim 3, wherein when the preset rule is the backward one-by-one turning-off rule;

correspondingly, the reference electrical parameter value comprises a fully-lit electrical parameter value;

correspondingly, the acquiring the reference electrical parameter value of the lamp bank, comprises:

controlling the lamp bank to fully turn on, and acquiring the fully-lit electrical parameter value; and correspondingly, the controlling the plurality of lamp beads to be turned on or turned off according to the preset rule, and acquiring the current electrical parameter value of the lamp bank; and determining the number of the current lamp beads according to the reference electrical parameter value and the current electrical parameter value, comprise:

starting from the preset lamp bead with the maximum number to control one lamp bead in the lamp bank to turn off;

detecting and recording an electric parameter value when the current single lamp bead is turned off as the current electric parameter value;

comparing the current electrical parameter value with the reference electrical parameter value to obtain a fourth comparison result, and in response to the fourth comparison result being not in conformity with a fourth stop condition, subtracting 1 from the counting variable; wherein, an initial value of the counting variable is the preset maximum number;

repeating the above steps for the previous lamp bead until the fourth comparison result is in conformity with the fourth stop condition; and acquiring the current counting variable, and obtaining the number of lamp beads according to the current counting variable.

9. The method of claim 3, wherein when the preset rule is the backward cumulative turning-on rule;

correspondingly, the controlling the plurality of lamp beads to be turned on or turned off according to the preset rule, and acquiring the current electrical parameter value of the lamp bank; and determining the number of the current lamp beads according to the reference electrical parameter value and the current electrical parameter value, comprise:

starting from the preset lamp bead with the maximum number to control the last i lamp beads in the lamp bank to be turned on; wherein, an initial value of i is 1;

detecting and recording an electric parameter value when the current single lamp bead is turned off as the current electric parameter value;

comparing the current electrical parameter value with the reference electrical parameter value to obtain a fifth comparison result, and in response to the fifth comparison result being not in conformity with a fifth stop condition, subtracting 1 from the counting variable, and letting i=i+1; wherein, an initial value of the counting variable is the preset maximum number;

repeating the above steps until the fifth comparison result is in conformity with the fifth stop condition; and acquiring the current counting variable, and obtaining the number of lamp beads according to the current counting variable.

10. The method of claim 1, wherein the electrical parameter value comprises a current value, a voltage value or a power value.

11. A lighting controller, comprising a memory, a processor and a computer program stored in the memory and executable by the processor, wherein the data processing program, when executed by the processor, causes the processor to perform the method of claim 1.

12. A lighting module, comprising:
the lighting controller of claim 11; and
a lamp bank, wherein the lamp bank is in communication connection with the lighting controller; and wherein the lamp bank comprises a plurality of lamp beads connected in sequence.

13. A non-transitory computer-readable storage medium storing a computer-executable instruction which, when executed by a processor, causes the processor to perform the method of claim 1.

* * * * *